(12) United States Patent
Bailly et al.

(10) Patent No.: US 9,847,655 B2
(45) Date of Patent: Dec. 19, 2017

(54) CHARGE BALANCING IN AN ELECTRIC BATTERY

(71) Applicant: Enerstone, Saint Martin d'Heres (FR)

(72) Inventors: Alain Bailly, Rousset (FR); Alexandre Chureau, Saint Martin d'Heres (FR)

(73) Assignee: Enerstone, Saint-Martin-d'Heres (FR)

( * ) Notice: Subject to any disclaimer, the term of this patent is extended or adjusted under 35 U.S.C. 154(b) by 0 days.

(21) Appl. No.: 14/759,279

(22) PCT Filed: Jan. 10, 2014

(86) PCT No.: PCT/FR2014/050038
§ 371 (c)(1),
(2) Date: Jul. 6, 2015

(87) PCT Pub. No.: WO2014/108645
PCT Pub. Date: Jul. 17, 2014

(65) Prior Publication Data
US 2015/0357842 A1 Dec. 10, 2015

(30) Foreign Application Priority Data

Jan. 11, 2013 (FR) ...................................... 13 50265

(51) Int. Cl.
*H02J 7/00* (2006.01)

(52) U.S. Cl.
CPC .................................. *H02J 7/0016* (2013.01)

(58) Field of Classification Search
CPC ...... H02J 7/0014; H02J 7/0016; H02J 7/0018; H02J 7/0019; H02J 2007/0037
USPC ................................................. 320/116, 118
See application file for complete search history.

(56) References Cited

U.S. PATENT DOCUMENTS

| | | | | | |
|---|---|---|---|---|---|
| 5,631,534 | A | * | 5/1997 | Lewis ................. | H01M 10/441 320/103 |
| 5,814,970 | A | * | 9/1998 | Schmidt ............. | H01M 10/441 320/118 |
| 2006/0119322 | A1 | * | 6/2006 | Maleki ................ | H01M 10/486 320/150 |
| 2007/0063670 | A1 | * | 3/2007 | Taurand ............... | H02J 7/0018 320/116 |

(Continued)

FOREIGN PATENT DOCUMENTS

| | | | |
|---|---|---|---|
| DE | 102008043593 A1 | 5/2010 | |
| EP | 2131471 A1 | 12/2009 | |
| FI | EP 2479868 A1 * | 7/2012 | ................ H02J 7/35 |

OTHER PUBLICATIONS

English Translation of the Written Opinion of the International Searching Authority filed in PCT/FR2014/050038; 5 pages.

(Continued)

*Primary Examiner* — Drew A Dunn
*Assistant Examiner* — Michael Dibenedetto
(74) *Attorney, Agent, or Firm* — Moreno IP Law LLC

(57) ABSTRACT

A system comprises an electric battery having at least four elementary cells in series and at least two balancing modules each having first and second nodes connected by at least three cells of the battery, and a third node connected to an intermediate point of the series-association of the at least three cells, in which at least one of the first and second nodes of each module is not common to a first or second node of another module.

10 Claims, 3 Drawing Sheets

(56) References Cited

U.S. PATENT DOCUMENTS

| | | | | |
|---|---|---|---|---|
| 2008/0116850 A1* | 5/2008 | Konishi | ............... | H02J 7/0016 320/118 |
| 2009/0195079 A1* | 8/2009 | Barrenscheen | ....... | H02J 7/0016 307/109 |
| 2010/0327807 A1* | 12/2010 | Kikinis | ................ | H02J 7/0016 320/116 |
| 2011/0089898 A1* | 4/2011 | Lee | ...................... | H02J 7/0016 320/116 |
| 2012/0212182 A1* | 8/2012 | Li | ........................ | H02J 7/0019 320/116 |
| 2013/0057198 A1* | 3/2013 | Gerlovin | .............. | H02J 7/0019 320/103 |

OTHER PUBLICATIONS

International Search Report filed in PCT/FR2014/050038, dated Apr. 29, 2014, 2 pages.

* cited by examiner

CHARGE BALANCING IN AN ELECTRIC BATTERY

The present patent application claims the priority benefit of French patent application FR13/50265 which is herein incorporated by reference.

BACKGROUND

The present disclosure generally relates to electronic circuits, and more particularly aims at a system comprising an electric battery and a circuit for balancing the charge levels of cells of the battery.

DISCUSSION OF THE RELATED ART

An electric battery usually comprises a group of a plurality of elementary cells (accumulators, etc.), series-connected between two nodes or terminals for providing a D.C. voltage. To maximize the battery performance and increase its lifetime, one may connect, to the intermediate nodes of the series association of the battery cells, a circuit configured to balance the charge levels of the cells during battery charge and/or discharge phases. Various balancing circuits have been provided. As an example, balancing devices are described in US patent application 2010/0327807 and in European patent application EP2131471. Such circuits however all have their specific disadvantages.

SUMMARY

An object of an embodiment is to provide a system for balancing the charge levels of cells of an electric battery, overcoming all or part of the disadvantages of existing balancing systems.

Thus, an embodiment provides a system comprising: an electric battery comprising at least four series-connected elementary cells; and at least two power transfer units each having first and second nodes connected through at least three cells of the battery, and a third node connected to an intermediate point of the series association of said at least three cells, each unit having at least one of its first and second nodes non-common with a first or second node of another unit, and each unit having its third node non-common with a third node of another unit.

According to an embodiment, each unit is capable of transferring electric power from the cell(s) connecting its first and third nodes towards the cell(s) connecting its second and third nodes, and conversely.

According to an embodiment, each intermediate point of the series association of the cells of the battery is connected to a third node of a module non-common with a third node of another unit.

According to an embodiment, the system further comprises a management circuit configured to receive data relative to the state of charge of the cells, and to control the transfer units by taking these data into account.

According to an embodiment, each unit comprises at least two switches and one inductive element.

According to an embodiment, the switches are series-connected between the first and second nodes of the unit, and said inductive element connects the junction point of the two switches to the third node of the unit.

According to an embodiment, each unit comprises a circuit for controlling its switches.

According to an embodiment, in each transfer unit, the switches of the unit are controlled by taking into account a measurement of the current flowing through the inductive element of the unit.

According to an embodiment, each of the battery cells comprises lithium and a lithium iron phosphate electrode.

According to an embodiment, the switches are MOS transistors.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings. Further, only those elements which are useful to the understanding of the present invention have been shown and will be described.

DETAILED DESCRIPTION

Figure 1:
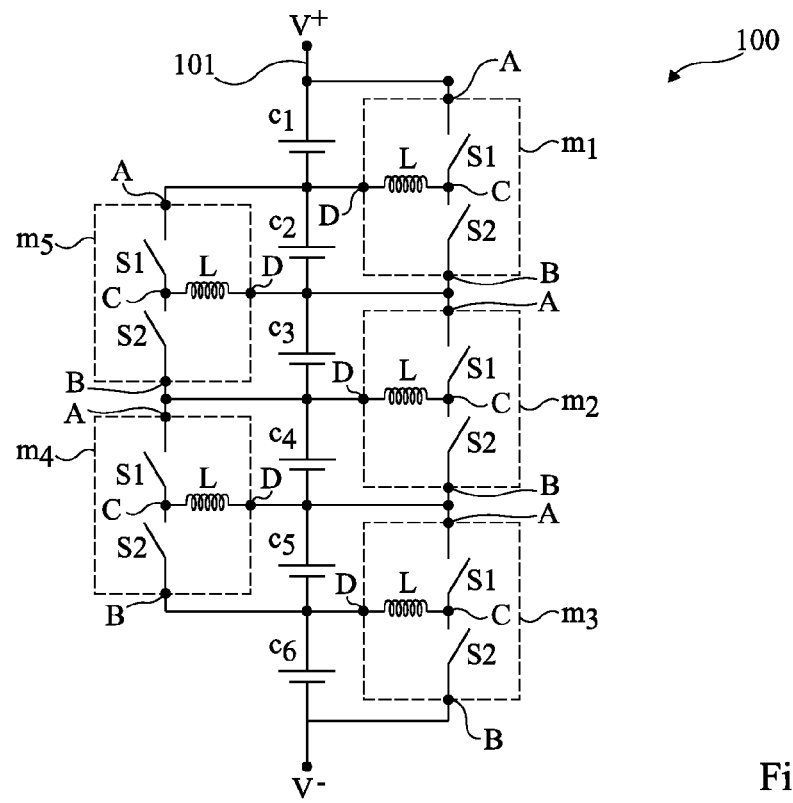
FIG. 1 is an electric diagram of an example of a system comprising an electric battery and a charge balancing circuit.

FIG. 1 is a simplified electric diagram of an example of a system 100 comprising an electric battery 101 and a charge balancing circuit connected to battery 101. In the shown example, battery 101 comprises six cells $c_i$ (i being an integer from 1 to 6) series connected, by order of increasing index, between nodes or terminals V+ and V− for delivering a D.C. voltage. The positive terminal of cell $c_1$ and the negative terminal of cell $c_6$ are respectively connected to terminals V+ and V− of the battery, and each of intermediate cells $c_2$ to $c_5$ of the battery has its positive terminal connected to the negative terminal of the adjacent cell of lower index, and its negative terminal connected to the positive terminal of the adjacent cell of higher index. In this example, the balancing circuit comprises five balancing units or power transfer units $m_j$ (j being an integer from 1 to 5). Each balancing unit $m_j$ comprises two switches S1 and S2, for example, MOS transistors, series-connected between first and second nodes A and B of the unit, and one inductive element L connecting junction point C of switches S1 and S2 of the unit to a third node D of the unit. In this example, no intermediate element is provided between switches S1 and S2 of a same unit, the ends of the series association of switches S1 and S2 of a unit are directly respectively connected to nodes A and B of this unit, and the ends of inductive element L of a unit may be directly respectively connected to nodes C and D of the unit. The described embodiments are however not limited to this specific case.

Each unit $m_j$ may further comprise an additional circuit (not shown in FIG. 1) for controlling its switches S1 and S2.

In the example of FIG. 1, each balancing unit $m_j$ has its nodes A, B, and D respectively connected to the positive terminal of cell $c_j$, to the negative terminal of cell $c_{j+1}$, and to the junction point of cells $c_j$ and $c_{j+1}$ (that is, the node connected to the negative terminal of cell $c_j$ and to the positive terminal of cell $c_{j+1}$). Thus, each unit $m_j$ may, via its switches S1 and S2 and its inductance L, transfer electric power from cell $c_j$ to cell $c_{j+1}$, or conversely.

The balancing circuit may further comprise a management circuit, not shown, configured to receive data relative to the state of charge of cells $c_i$, and to accordingly control units $m_j$ to transfer electric power from the most charged cells to the least charged cells.

An advantage of balancing system 100 of FIG. 1 is that it enables to efficiently transfer electric power between adjacent cells. Indeed, transferring electric power from one cell $c_j$ to one of its neighbors $c_{j-1}$ or $c_{j+1}$ only requires activating a single balancing unit ($m_{j-1}$ or $m_j$).

However, a problem is that if power is desired to be transferred between two distant cells of the battery, it is necessary to use all the balancing units located between these cells, which results in relatively significant power losses, particularly by dissipation in switches S1 and S2 of the units which are used.

Figure 2:
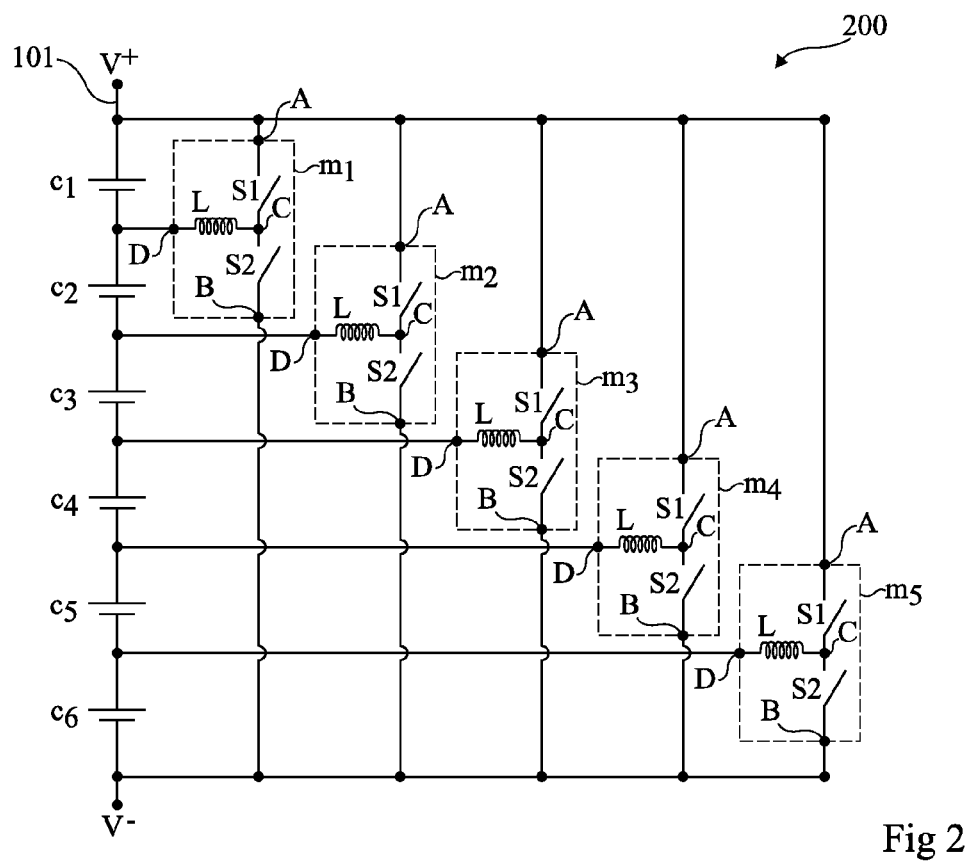
FIG. 2 is an electric diagram of another example of a system comprising an electric battery and a charge balancing circuit.

FIG. 2 is an electric diagram of another example of a system 200 comprising an electric battery 101, and a charge balancing circuit connected to battery 101. In the shown example, battery 101 is the same as in the example of FIG. 1, and the balancing circuit comprises, as in the example of FIG. 1, five balancing units or power transfer units $m_j$ (j being an integer from 1 to 5). The balancing units may have the same electric diagram as those described in relation with FIG. 1.

System 200 of FIG. 2 differs from system 100 of FIG. 1 essentially by the diagram of connection of balancing units $m_j$ to battery 101. In the example of FIG. 2, each unit $m_j$ has its nodes A, B, and D respectively connected to positive terminal V+ of the battery, to negative terminal V− of the battery, and to the junction point of cells $c_j$ and $c_{j+1}$. Thus, each balancing unit $m_j$ may, via its switches S1 and S2 and its inductance L, transfer electric power from the cell(s) located between its node D and terminal V+ of the battery (cells $c_1$ to $c_j$), towards the cell(s) located between its node D and terminal V− of the battery (cells $c_{j+1}$ to $c_6$), or conversely.

The balancing circuit may further comprise a management circuit, not shown, configured to receive information relative to the state of charge of cells $c_i$, and to accordingly control units $m_j$ to transfer electric power from the most strongly charged cells to the least charged cells.

An advantage of balancing system 200 of FIG. 2 is that it enables to transfer power between distant cells of the battery, by activating a smaller number of balancing units than in the system of FIG. 1.

However, a problem is that the system of FIG. 2 is less efficient than the system of FIG. 1 to transfer power between adjacent cells of the battery.

Another problem of the system of FIG. 2 is due to the fact that, in the system of FIG. 2, switches S1 and S2 of each balancing unit $m_j$ see between their terminals all the voltage between terminals V+ and V− of the battery. In the system of FIG. 2, switches having a higher breakdown voltage than in the system of FIG. 1, where switches S1 and S2 only see the voltage across the series association of two adjacent elementary cells, should thus be selected. This increases the cost and the bulk of the balancing circuit. This further makes it impossible to balance the battery beyond a maximum voltage conditioned by the breakdown voltage of the switches, which limits the system modularity. Further, this increases electric power losses during transfers, since switches having a high breakdown voltage are generally more resistive in the on state than switches having a lower breakdown voltage.

An object of an embodiment is to solve all or part of the problems of balancing systems of the type described in relation with FIGS. 1 and 2.

Figure 3:
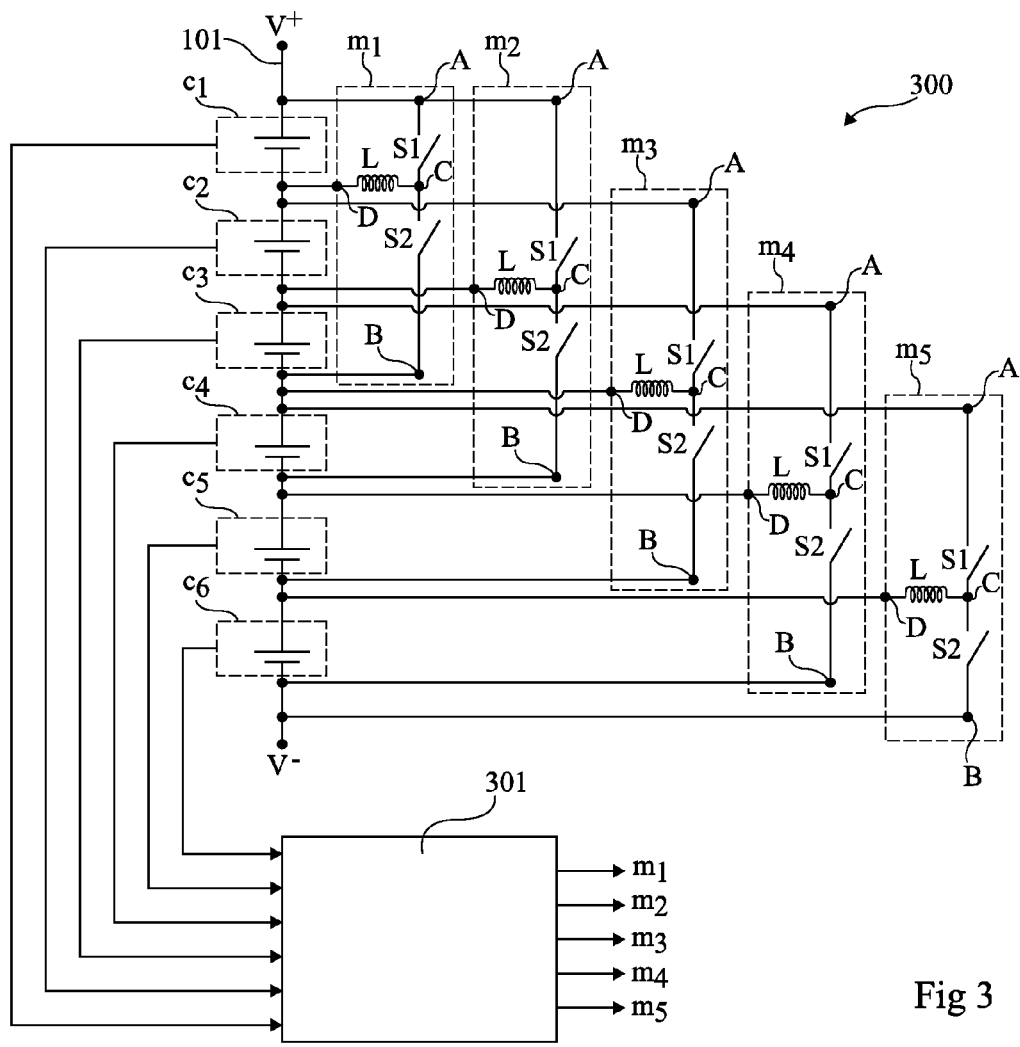
FIG. 3 is an electric diagram illustrating an embodiment of a system comprising an electric battery and a charge balancing circuit.

FIG. 3 is an electric diagram illustrating an embodiment of a system 300 comprising an electric battery 101, and a charge balancing circuit connected to battery 101. In the shown example, battery 101 is the same as in the examples of FIGS. 1 and 2, and the balancing circuit comprises, as in the examples of FIGS. 1 and 2, five balancing units or electric power transfer units $m_j$ (j being an integer from 1 to 5). Balancing units $m_j$ may have the same electric diagram as those described in relation with FIGS. 1 and 2.

System 300 of FIG. 3 differs from the systems of FIGS. 1 and 2 essentially by the diagram of connection of balancing units $m_j$ to battery 101. In the example of FIG. 3, each unit $m_j$, except for the two end units $m_1$ and $m_5$, has its nodes A, B, and D respectively connected to the positive terminal of cell $c_{j-1}$, to the negative terminal of cell $c_{j+2}$, and to the junction point of cells $c_{j-1}$ to $c_{j+2}$ (that is, to the node of connection between the negative terminal of cell $c_j$ and the positive terminal of cell $c_{j+1}$). In this example, nodes A, B, and D of unit $m_1$ are respectively connected to terminal V+ of the battery, to the negative terminal of cell $c_3$, and to the junction point of cells $c_1$ and $c_2$, and nodes A, B, and D of unit $m_5$ are respectively connected to the positive terminal of cell $c_4$, to terminal V− of the battery, and to the junction point of cells $c_5$ and $c_6$. Thus, each balancing unit $m_j$, except for the two end units $m_1$ and $m_5$, may, via its switches S1 and S2, transfer electric power from the series association of cells $c_{j-1}$ and $c_j$ to the series association of cells $c_{j+1}$ and $c_{j+2}$, or conversely. Unit $m_1$ may, via its switches S1 and S2, transfer power from cell $c_1$ to cells $c_2$ and $c_3$ or conversely. Unit $m_5$ may, via its switches S1 and S2, transfer power from cells $c_4$ and $c_5$ to cell $c_6$ or conversely.

The balancing circuit may further comprise a management circuit 301, configured to receive data relative to the state of charge of cells $c_i$, and to accordingly control units $m_j$ to transfer electric power from the most charged cells or groups of cells to the least charged cells or groups of cells. As an example, the state of charge of cells $c_i$ may be determined by voltage and/or current measurements or by any other known means.

An advantage of balancing system 300 of FIG. 3 is that it enables to transfer power between distant cells of the battery by using a smaller number of balancing units than in the system of FIG. 1. This particularly enables, during power transfers between distant cells of the battery, to decrease resistive losses in the switches of the balancing units with respect to the system of FIG. 1.

Another advantage of the system of FIG. 3 is that it is more efficient than the system of FIG. 2 to transfer power between adjacent or close cells of the battery.

Another advantage of the system of FIG. 3 is that switches S1 and S2 of balancing units $m_j$ do not see all the voltage between terminals V+ and V− of the battery, but only see the voltage across the series association of three or four elementary cells. Switches having a lower breakdown voltage than in the system of FIG. 2 can thus be used. This particularly enables to decrease the cost, the bulk, and the electric power consumption of the balancing circuit with respect to the system of FIG. 2. This further enables to provide a greater modularity to the system.

Figure 4:
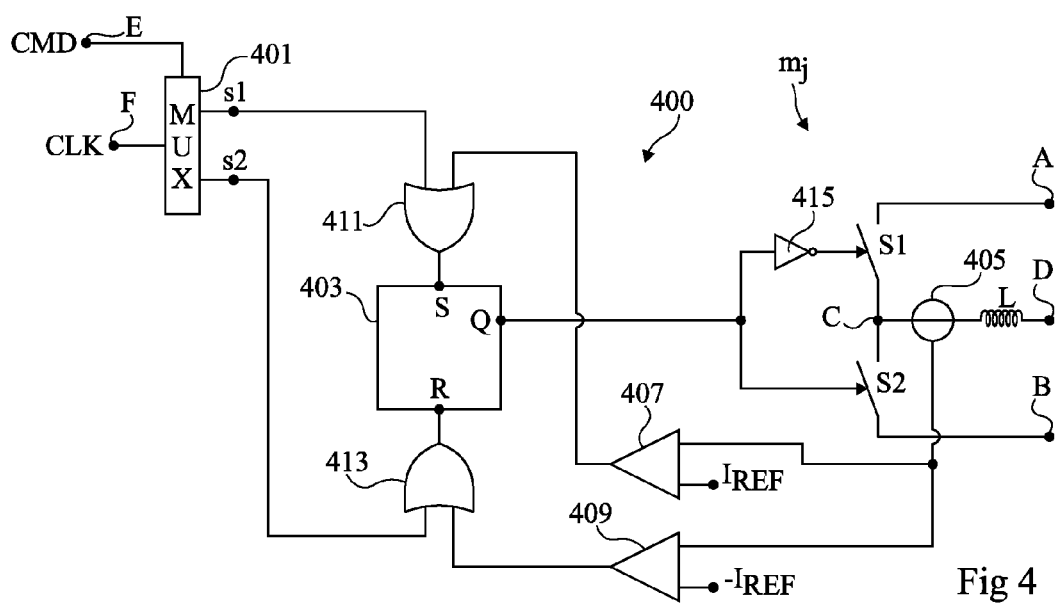
FIG. 4 is an electric diagram illustrating in further detail an embodiment of a balancing unit of the balancing circuit of FIG. 3.

Another advantage of the system of FIG. 3 is that it allows more efficient and faster power transfers between adjacent or close cells of the battery as compared with a known system of the type shown in FIG. 4 of above-mentioned US patent application 2010/0327807, where all the balancing units have an intermediate node connected to the same central node of the series association of the battery cells. In other words, in the system of FIG. 3, the fact for the different balancing units $m_j$ to have their nodes D connected to different points of the series association of the battery cells increases the number of possible balancing scenarios with respect to the system of FIG. 4 of US application 2010/0327807.

Another advantage of the system of FIG. 3 is that it has a greater modularity than the system of FIG. 4 of US application 2010/0327807. Indeed, in the system of FIG. 3, all balancing units approximately see the same voltage between their terminals, independently from the total battery voltage, while in the system of FIG. 4 of US application 2010/0327807, all the balancing units see different voltages between their terminals.

The system of FIG. 3 further has similar or identical advantages over the balancing systems of above-mentioned patent application EP2131471. It should further be noted that application EP2131471 concerns balancing systems which dissipate the electric power of cells having too high a voltage, and not systems by power transfer between cells of the type described in relation with FIGS. 1 to 3 of the present application.

The embodiment described in relation with FIG. 3 is of course not limited to systems where the battery comprises six elementary cells, but more generally applies to any battery comprising at least four series-connected elementary cells.

Whatever number n of series-connected cells $c_i$ (i being an integer in the range from 1 to n and n≥4), a balancing circuit comprising n−1 balancing units $m_j$ (j being an integer in the range from 1 to n−1) is preferably provided, each unit $m_j$ having its node D connected to the junction point of cells $c_j$ and $c_{j+1}$.

In the example of FIG. 3, each unit $m_j$ has its nodes A and B connected by the series association of three or four cells of the battery. As a variation, it may be provided for each balancing unit $m_j$ to have its nodes A and B connected by a larger number of cells, provided that at least one unit $m_j$ of the balancing circuit does not receive all the battery voltage between its nodes A and B.

In a preferred embodiment, in each unit $m_j$, except for the units having their node D connected to the cells closest to terminals V+ and V− of the battery, the number of cells $c_i$ located between nodes A and D of the unit is the same as the number of cells $c_i$ located between nodes D and B of the unit (this number being greater than or equal to 2).

In other words, a system comprising the following elements may be provided: an electric battery having at least four series-connected elementary cells; and at least two balancing units $m_j$, each unit $m_j$ having its nodes A and B connected by the series association of at least three cells of the battery, and its node D connected to an intermediate node of this series association, each unit $m_j$ having at least one of its nodes A and B non-common with a node A or B of another unit.

Examples of modes of control of balancing units $m_j$ described in relation with FIGS. 1 to 3 will now be described. In these examples, during a period of activation of a unit $m_j$, switches S1 and S2 of this unit are controlled complementarily (that is, when switch S1 is on, switch S2 is off, and conversely), so that switches S1 and S2 are never on at the same time, which would short the cells located between nodes A and B of the unit. Further, each unit $m_j$ may be deactivated by the simultaneous turning off of its two switches S1 and S2.

The control of balancing units $m_j$ may be a passive control, that is, a control where, during a period of activation of a unit $m_j$, the direction of electric power transfers between the cell(s) located between nodes A and D of the unit on the one hand and the cell(s) located between nodes B and D of the unit on the other hand, as well as the quantity of transferred power, essentially depend on the voltage levels between nodes A and D on the one hand, and between nodes D and B on the other hand. When a passive control is implemented, electric power is naturally transferred from the series association of cells between nodes A and D or between nodes D and B which has the highest voltage level to the series association of cells between nodes D and B or between nodes A and D which has the lowest voltage level, and this until the voltage levels are balanced or the unit is deactivated.

As an example, in a first passive control mode, switches S1 and S2 of the unit may be periodically turned on and then off, at a constant frequency and with a constant turn-off/turn-on duty cycle (for example, 0.5). After some time, the voltage levels between the two stages (A-D and D-B) of the unit naturally converge towards a same value.

As a variation, in a second passive control mode, it may further be provided to limit the current in inductive element L of the unit, which enables, in particular, to limit losses by dissipation in switches S1 and S2 of the unit. To achieve this, it may be provided to measure the current flowing through inductive element L and, when this current exceeds a positive or negative threshold, to force the switching of switches S1 and S2 to reverse the voltage across element L. Thus, in the second passive control mode, the turn-off/turn-on duty cycle of the switches is no longer constant, but automatically adjusts according to the voltage level difference between the two stages of the unit. After some time, the voltage levels between the two stages of the unit naturally converge towards a same value.

Passive control modes have the advantage of being relatively simple to implement. However, a problem is that power transfers from a cell or from a group of cells to another cell or another group of cells are mainly based on the voltage level differences between the cells or groups of cells. This does not always enable to efficiently balance the battery, particularly when the cells are formed in technologies where the voltage level of a cell is little or not representative of its state of charge, which is for example true for certain lithium cells, and in particular lithium iron phosphate cells ($LiFePO_4$), that is, lithium-ion cells comprising a lithium iron phosphate electrode.

To overcome this problem, the control of the balancing units may be a so-called active control, that is, a control where, during a period of activation of a unit $m_j$, the electric power transfer direction in the unit is forced, as well as the quantity of transferred electric power, independently from the voltage levels between nodes A and D of the unit on the one hand, and between nodes D and B of the unit on the other hand.

FIG. 4 is an electric diagram illustrating in further detail an embodiment of a balancing unit $m_j$ of the type described in relation with FIGS. 1 to 3, comprising a control circuit capable of implementing an active control of the unit. Unit $m_j$ of FIG. 4 comprises the same elements as the balancing units already described in relation with FIGS. 1 to 3, that is, two series-connected switches S1 and S2 between nodes A and B of the unit, and one inductive element L between junction point C of switches S1 and S2 and a node D of the unit. Unit $m_j$ of FIG. 4 further comprises a circuit 400 for controlling its switches S1 and S2.

In this example, circuit 400 comprises a node E of application of a signal CMD for controlling the direction of electric power transfer by the unit, and a node F of application of a periodic pulse signal or clock signal CLK. Signals CMD and CLK may be provided by a management circuit external to the unit, for example, management circuit 301 (BMS) of FIG. 3. As a variation, clock signal CLK may be provided by a circuit (not shown) internal to unit $m_j$. Circuit 400 further comprises a multiplexer 401 receiving as an input signals CLK and CMD, and comprising two outputs s1 and s2. The operation of multiplexer 401 is such that when signal CMD is in the high state, signal CLK is shunted to output s1 of the multiplexer, and output s2 of the multiplexer is maintained in the low state, and when signal CMD is in the low state, signal CLK is shunted to output s2 of the multiplexer, and output s1 of the multiplexer is maintained in the low state. Circuit 400 further comprises a SR latch 403, comprising two inputs S and R and one output Q. The operation of latch 403 is such that as soon as the S input is set to the high state, the Q output is set to the high state, and as soon as the R input is set to the high state, the Q output is set to the low state. When none of the S and R inputs is in the high state, the Q output keeps its former state. Circuit 400 further comprises a device 405 for measuring the current flowing through inductive element L of the unit, and two comparators 407 and 409 configured to compare the current value measured by device 405 respectively with a positive threshold $I_{REF}$ and with a negative threshold $-I_{REF}$. In this example, the output of comparator 407 is in the low state when the current measured in inductive element L is lower than threshold $I_{REF}$, and in the high state when the current measured in inductive element L is higher than threshold $I_{REF}$, and the output of comparator 409 is in the low state when the current measured in inductive element L is higher than threshold $-I_{REF}$, and in the high state when the current measured in inductive element L is lower than threshold $-I_{REF}$. Circuit 400 further comprises an OR gate 411 comprising two inputs respectively connected to output s1 of multiplexer 401 and to the output of comparator 407, and an OR gate 413 comprising two inputs respectively connected to output s2 of multiplexer 401 and to the output of comparator 409. The output of OR gate 411 is connected to the S input of latch 403 and the output of OR gate 413 is connected to the R input of latch 403. The Q output of latch 403 is connected to a control node of switch S2 and to the input of an inverter 415 having its output connected to a control node of switch S1. Circuit 400 may further comprise an activation/deactivation circuit, not shown, configured to simultaneously turn off the two switches S1 and S2 of the unit when a deactivation signal is received by the unit.

During a period of activation of unit $m_j$, when signal CMD is in the high state, signal CLK is shunted to output s1 of multiplexer 401, and output s2 of the multiplexer is in the low state. A positive pulse of signal CLK results in switching the Q output of latch 403 to the high state, and thus in turning on switch S2 and turning off switch S1. A negative current then flows in inductance L, from node D to node B. As long as the current measured in inductance L is higher than threshold $-I_{REF}$, the Q output of the latch does not switch state. When the current measured in inductance L becomes lower than threshold $-I_{REF}$, the output of comparator 409 switches to the high state, which causes the switching to the low state of the Q output of latch 403, and thus in the switching of switches S1 and S2. This causes the inversion of the sign of the voltage across inductance L, and thus an increase in the current flowing through inductance L. The output of comparator 409 then switches back to the high state. The Q output of latch 403 remains in the low state until the next pulse of signal CLK, after which the cycle described at the present paragraph is resumed.

When signal CMD is in the high state, signal CLK is shunted to output s2 of multiplexer 401, and output s1 of the multiplexer is in the low state. A positive pulse of signal CLK results in switching the Q output of latch 403 to the low state, and thus in turning on switch S1 and turning off switch S2. A positive current then flows through inductance L, from node A to node D. As long as the current measured in inductance L is lower than threshold $-I_{REF}$, the Q output of the latch does not switch state. When the current measured in inductance L becomes higher than threshold $I_{REF}$, the output of comparator 407 switches to the high state, which causes the switching to the high state of the Q output of latch 403, and thus in the switching of switches S1 and S2. This causes the inversion of the sign of the voltage across inductance L, and thus a decrease in the current flowing through inductance L. The output of comparator 407 then switches back to the high state. The Q output of latch 403 remains in the high state until the next pulse of signal CLK, after which the cycle described at the present paragraph is resumed.

Thus, the state of signal CMD determines the current flow direction in inductance L of the unit, comparators 407 and 409 enabling to limit the intensity of this current. The unit activation time determines the quantity of transferred power.

Other active or passive control modes than those described in the present application may be used to control balancing units $m_j$. Further, whatever the active or passive control mode used, the claimed embodiments are not limited to the case where the control of a balancing unit $m_j$ is implemented via a control circuit comprised in this unit. As a variation, it may be provided to transfer all or part of the control functions of switches S1 and S2 of the unit to an external management unit, for example, management circuit 301 (BMS) of FIG. 3, a microcontroller (not shown), etc. As an example, management circuit 301 (BMS) of FIG. 3 may be configured to directly measure the current flowing through inductive element L of each of units $m_j$, and to directly control switches S1 and S2 of the units. As a variation, each balancing unit may comprise a microcontroller connected to management circuit 301 (BMS). Further, in the case of an active control of the balancing units, it will be within the abilities of those skilled in the art to provide other control circuits than circuit 400 described in relation with FIG. 4.

Other embodiments of balancing or power transfer units $m_j$ than those described in relation with FIGS. 1 to 4 may be provided. More particularly, the embodiment of FIG. 3 is compatible with any balancing unit capable of transferring electric power from elementary cells connecting first and second nodes of the unit to elementary cells connecting the second node to a third node of the unit, or conversely.

Figure 5:
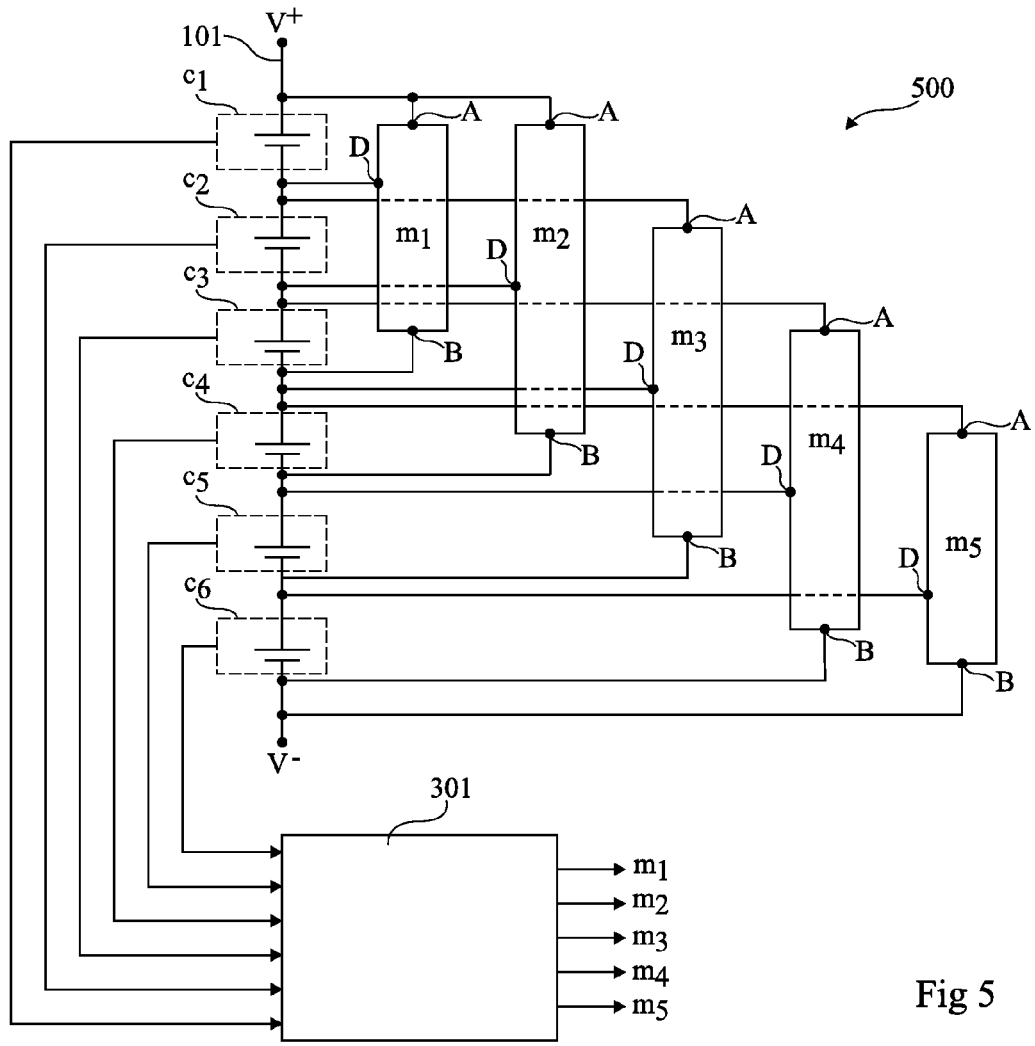
FIG. 5 is an electric diagram illustrating a generalization of the system of FIG. 3.

FIG. 5 is an electric diagram showing a generalization of the system of FIG. 3 to any balancing unit capable of transferring electric power from elementary cells connecting first and second nodes of the unit to elementary cells connecting the second node to a third node of the unit, or conversely. FIG. 5 shows a system 500 comprising an electric battery 101, and a charge balancing circuit connected to battery 101. In the example of FIG. 5, battery 101 is the same as in the examples of FIGS. 1 to 3, and the balancing circuit comprises, as in the examples of FIGS. 1 to 3, five balancing units or electric power transfer units $m_j$ (j being an integer from 1 to 5). In FIG. 5, balancing units $m_j$ have been schematized by blocks or black boxes, each having three connection nodes A, B, and D, without showing the detailed structure of the blocks. Functionally, each balancing unit $m_j$ is, as in the examples described in relation with FIGS. 1 to 4, capable of transferring electric power, for example, by inductive power transfer, from elementary cells connecting its nodes A and D, to elementary cells connecting its nodes D and B, or conversely. In system 500 of FIG. 5, balancing units $m_j$ may be connected according to the connection modes described in relation with FIG. 3, that is, each unit $m_j$ has its nodes A and B connected by the series association of at least three battery cells and its node D connected to an intermediate point of the series association of cells connecting its nodes A and B, where at least one unit $m_j$ does not receive all the battery voltage between its nodes A and B.

Figures 6A, 6B, 6C:
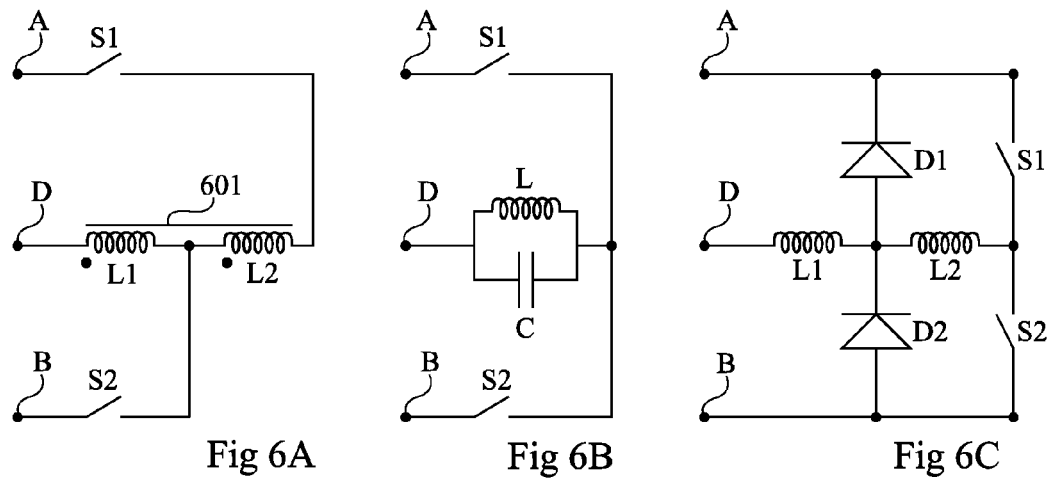
FIGS. 6A to 6C are electric diagrams illustrating alternative embodiments of a balancing unit of the circuit of FIG. 5.

Balancing units $m_j$ of system 500 may have a topology of the type described in relation with FIGS. 1 to 4, that is, they may comprise two switches in series between nodes A and B of the unit, and an inductance connecting node D of the unit to the junction point of the two switches. As a variation, balancing units $m_j$ of system 500 may have other topologies. FIGS. 6A to 6C schematically show other examples of topology of units $m_j$ of system 500.

FIG. 6A is a simplified electric diagram illustrating an embodiment of a balancing or power transfer unit $m_j$ of system 500 of FIG. 5.

In this example, unit $m_j$ comprises two series-connected inductances L1 and L2, coupled together by a magnetic circuit 601. Node D of the unit is connected to one end of the series association of the two inductances L1 and L2, the other end of the series association of inductances being connected to node A via a switch S1. The junction point of inductances L1 and L2 is connected to node B via a switch S2. Unit $m_j$ may further comprise an additional circuit (not shown) for controlling its switches S1 and S2, where this control circuit may be capable of implementing a passive and/or active control of the unit.

The topology of FIG. 6A is particularly adapted to the case where the number of elementary cells of the battery between nodes A and D of the unit is not the same as the number of elementary cells between nodes D and B of the unit. The number of spirals of inductance L2 may be adjusted according to the difference between the number of cells connected between nodes B and D of the unit and the number of cells connected between nodes A and D of the unit, to adapt the currents to the numbers of connected cells.

FIG. 6B is a simplified electric diagram illustrating another embodiment of a balancing or power transfer unit $m_j$ of system 500 of FIG. 5.

In this example, unit $m_j$ comprises two switches S1 and S2 series-connected between nodes A and B of the unit, and one inductance L connecting the junction point of switches S1 and S2 to node D of the unit. Unit $m_j$ of FIG. 6B further comprises a capacitive element C connected in parallel with inductance L, between the junction point of switches S1 and S2 and node D of the unit. Unit $m_j$ may further comprise an additional circuit (not shown) for controlling its switches S1 and S2, where this control circuit may be capable of implementing a passive and/or active control of the unit.

As compared with the embodiments described in relation with FIGS. 1 to 4, adding capacitive element C enables to obtain a resonance of the unit at certain frequencies.

FIG. 6C is a simplified electric diagram illustrating another embodiment of a balancing or power transfer unit $m_j$ of system 500 of FIG. 5.

In this example, unit $m_j$ comprises two switches S1 and S2 series-connected between nodes A and B of the unit, and two inductances L1 and L2 series-connected between node D of the unit and the junction point of switches S1 and S2. In this example, inductance L1 is located on the side of node D, and inductance L2 is located on the side of the junction point of switches S1 and S2. Inductance L2 preferably has a lower value than inductance L1. In this example, unit $m_j$ further comprises a diode D1 between the junction point of inductances L1 and L2 and node A, and a diode D2 between the junction point of inductances L1 and L2 and node B. The cathode of diode D1 is on the side of node A, and the anode of diode D2 is on the side of node B. Unit $m_j$ may further comprise an additional circuit (not shown) for controlling its switches S1 and S2, where this control circuit may be capable of implementing a passive and/or active control of the unit.

As compared with the embodiments described in relation with FIGS. 1 to 4, the topology of FIG. 6C enables to smooth the switching of switches S1 and S2, and to avoid parasitic voltage and/or current peaks.

Specific embodiments have been described. Various alterations, modifications, and improvements will readily occur to those skilled in the art.

In particular, it will be within the abilities of those skilled in the art to form a system of the type described in relation with FIGS. 3 and 5 by using other balancing or power transfer unit topologies than those described hereabove.

Further, in the above-described embodiments, balancing or power transfer units $m_j$ may be used for other purposes than the balancing of the battery cell charge levels. As an example, in case of a cell failure, or to perform a diagnosis on a cell, power transfers which do not aim at balancing the charge levels but for example aim at fully discharging one or a plurality of cells or at charging to a maximum one or a plurality of cells may be provided. Further, the power transfers may be performed not only during battery charge and/or discharge phases, but also when the battery is at rest.

The invention claimed is:

1. A system comprising:
an electric battery comprising at least four series-connected elementary cells;
at least two first power transfer units each having first and second nodes connected across a series association of a same number n of cells of the battery, wherein n≥4, and a third node connected to an intermediate point of the series association of n cells, each first power transfer unit having at least one of its first and second nodes non-common with a first or second node of another first power transfer unit, and each first power transfer unit having its third node non-common with a third node of another first power transfer unit; and
at least one second power transfer unit having first and second nodes connected across a series association of n-1 cells of the battery, and a third node connected to an intermediate point of the series association of n-1 cells, said at least one second power transfer unit having its third node non-common with a third node of a first power transfer unit.

2. The system of claim 1, wherein each unit of the at least two first power transfer units is capable of transferring electric power from the cell(s) connecting its first and third nodes towards the cells connecting its second and third nodes, and conversely.

3. The system of claim 1, wherein each intermediate point of the series association of the cells of the battery is connected to a third node of a unit of the at least two first power transfer units non-common with a third node of another unit of the at least two first power transfer units.

4. The system of claim 1, further comprising a management circuit configured to receive data relative to the state of charge of the cells, and to control the transfer units by taking these data into account.

5. The system of claim 1, wherein each unit comprises at least two switches and one inductive element.

6. The system of claim 5, wherein said switches are series-connected between the first and second nodes of the unit, and said inductive element connects the junction point of the two switches to the third node of the unit.

7. The system of claim 5, wherein each unit comprises a circuit for controlling its switches.

8. The system of claim 5, wherein in each transfer unit, the switches of the unit are controlled by taking into account a measurement of the current flowing through the inductive element of the unit.

9. The system of claim 1, wherein each of the battery cells comprises lithium and a lithium iron phosphate electrode.

10. The system of claim 5, wherein said switches are MOS transistors.

* * * * *